United States Patent [19]
Sawada

[11] Patent Number: 5,835,814
[45] Date of Patent: Nov. 10, 1998

[54] ELECTROPHOTOGRAPHIC METHOD AND APPARATUS FOR FORMING COLOR IMAGES, AND EXPOSURE UNIT THEREFOR

[75] Inventor: Hideki Sawada, Kyoto, Japan

[73] Assignee: Rohm Co. Ltd., Kyoto, Japan

[21] Appl. No.: 788,958

[22] Filed: Jan. 24, 1997

[30] Foreign Application Priority Data

Jan. 26, 1996 [JP] Japan ..................................... 8-011414

[51] Int. Cl.⁶ ........................... G03G 15/22; G01D 15/06
[52] U.S. Cl. ................. 399/4; 347/119; 347/238
[58] Field of Search ............................. 399/223, 4, 177, 399/178; 347/115, 118, 119, 116, 112, 232, 238

[56] References Cited

U.S. PATENT DOCUMENTS

| | | | |
|---|---|---|---|
| 4,845,519 | 7/1989 | Fuse | 347/112 |
| 5,025,269 | 6/1991 | Saeki et al. | 347/116 |
| 5,040,003 | 8/1991 | Willis | 347/118 |
| 5,083,144 | 1/1992 | Altmann | 399/223 X |
| 5,179,392 | 1/1993 | Kawaguchi | 347/118 |

*Primary Examiner*—S. Lee
*Attorney, Agent, or Firm*—Michael D. Bednarek; Kilpatrick Stockton LLP

[57] ABSTRACT

Full color images are formed by electrophotography which utilizes a rotary member having an endless photosensitive surface which has a plurality of different band regions divided in a direction perpendicular to a rotational direction of the rotary member. The photosensitive surface is electrostatically charged, and the plural band regions are simultaneously irradiated each with light of a different color to electrostatically form a different latent image in each of the band regions. Then, the latent images of the respective band regions are developed to provide a set of differently colored images which are transcribed onto a recording medium. After the set of differently colored images is transcribed onto the recording medium, the recording medium is indexed in a direction perpendicular to the rotational direction of the rotary member. These steps are repeated in a manner such that a subsequently transcribed set of differently colored images overlaps a previously transcribed set of differently colored images to form combined color images on the recording medium.

7 Claims, 5 Drawing Sheets

ELECTROPHOTOGRAPHIC METHOD AND APPARATUS FOR FORMING COLOR IMAGES, AND EXPOSURE UNIT THEREFOR

BACKGROUND OF THE INVENTION

1. Field of the Invention:

The present invention relates to a method and an apparatus for forming color images by electrophotography for use in a color printer or a color photocopier. The present invention also relates to an exposure device which is advantageously usable in the color image forming method or apparatus.

2. Description of the Related Art:

In color printers or color copiers, various methods are used for forming desired color images on a recording medium such as a paper sheet. Typical methods for color printing include an ink jet method and electrophotography.

The ink jet method is advantageous for its capability of realizing a reduction of apparatus size and weight while also reducing the manufacturing cost of the apparatus. However, this method is disadvantageous in that the printing speed becomes very low for obtaining a high image quality.

By contrast, the electrophotography is advantageous for its ability of providing a high image quality at a high speed. However, this method requires a large-sized apparatus which is expensive to make.

There are two types of electrophotographic machines for forming color images. A first type utilizes a single photosensitive drum and a single rotary developing device. A second type utilizes a plurality of photosensitive drums each of which is associated with an electrostatic charging device, an exposure device and a developing device.

In the first type electrophotographic machine, the single photosensitive machine and an associated transcription drum make a full rotation for each of four different colors for example while the rotary developing device make a 90° turn for switching the toners from one color to another to form differently colored images on the transcription drum in overlapping relation. More specifically, the process steps of electrostatic charging, exposing, developing, transcribing and charge-removing/cleaning are repetitively performed for each of the four different colors to form a combined color image on the transcription drum, and the combined color image is finally transcribed from the transcription drum to the paper sheet. Thus, due to the need for the transcription drum and the rotary developing device, this type of electrophotographic machine is likely to be large-sized and expensive to make. Further, since it is difficult to completely remove redundant toner from the photosensitive drum after transcription of the image to the transcription drum, the differently colored toners may mix with each other to lower the color image quality.

In the second type electrophotographic machine, the plurality of photosensitive drums are used for separately performing the process steps of electrostatic charging, exposing, developing, transcribing and charge-removing/cleaning synchronously for different colors. The differently colored images formed on the respective photosensitive drums are first transcribed simultaneously onto a transcription belt, and the thus transcribed images are then transcribed onto the recording medium in a plurality of successive steps for overlapping. Thus, due to the need for the plural photosensitive drums each associated with the charging device, the exposure device, the developing device, and the transcription belt, this type of electrophotographic machine is also likely to be large-sized and expensive to make.

SUMMARY OF THE INVENTION

It is, therefore, an object of the present invention to provide a color image forming method which is capable of forming high-quality color images at a high speed by utilizing the advantages of the electrophotography.

Another object of the present invention is to provide a color image forming apparatus which can be advantageously used for constituting a small-sized light printer or photocopier at a low cost.

A further object of the present invention is to provide an exposure device which may be advantageously utilized in the color image forming method or apparatus.

According to a first aspect of the present invention, there is provided a method for making color images by electrophotography comprising the steps of: rotating a rotary member having an endless photosensitive surface which has at least three different band regions divided in a direction perpendicular to a rotational direction of the rotary member; electrostatically charging the photosensitive surface of the rotary member; simultaneously irradiating said at least three band regions each with light of a different color to electrostatically form a different latent image in each of said at least three band regions; simultaneously developing the latent images of said at least three band regions to provide a set of differently colored images; and transcribing the set of differently colored images onto a recording medium; wherein the recording medium is indexed in a direction perpendicular to the rotational direction of the rotary member after the set of differently colored images is transcribed onto the recording medium; and wherein the above steps are repeated in a manner such that a subsequently transcribed set of differently colored images overlaps a previously transcribed set of differently colored images to form combined color images on the recording medium.

With the method described above, since the band regions of the photosensitive surface are used for forming a set of differently colored images for transcription to the recording medium, there is no need for using a plurality of photosensitive members and a plurality of developing devices for different colors, thereby reducing the size and weight of the image forming unit while also realizing a manufacturing cost reduction. Further, since the recording medium is moved in a secondary scanning direction which is perpendicular to the rotational direction (primary scanning direction) of the rotary member, the image forming unit incorporating the rotary member and its associated components may be small-sized.

Moreover, since the band regions of the photosensitive surface are distinctly separated from each other, it is unlikely that the toners for different colors are unexpectedly mixed with each other, thereby preventing a deterioration of the printing quality due to such toner mixing. Of course, the electrophotographic nature of the color image forming method inherently provides a higher image quality and a higher printing speed.

According to a preferred embodiment, the recording medium is a paper sheet, whereas the rotary member is a photosensitive drum which rotates in contact with the recording medium. In this case, the photosensitive drum is moved in a direction perpendicular to a rotational axis of the drum for transcribing the set of differently colored images onto the paper sheet in band form.

The set of differently colored images may preferably include a yellow image, a magenta image, a cyan image and a black image by using toners of four different colors.

According to a second aspect of the present invention, there is provided an apparatus for making color images by electrophotography comprising: a rotary member having an endless photosensitive surface which has at least three different band regions divided in a direction perpendicular to a rotational direction of the rotary member; a charging device for electrostatically charging the photosensitive surface of the rotary member; an exposure device for simultaneously irradiating said at least three band regions each with light of a different color to electrostatically form a different latent image in each of said least three band regions; a developing device for simultaneously developing the latent images of said at least three band regions to provide a set of differently colored images; a transcription unit for transcribing the set of differently colored images onto a recording medium; and means for repetitively indexing by a predetermined amount in a direction perpendicular to the rotational direction of the rotary member every time a set of differently colored images is transcribed onto the recording medium, so that a subsequently transcribed set of differently colored images overlaps a previously transcribed set of differently colored images to form combined color images on the recording medium.

In a preferred embodiment, the exposure device comprises at least three LED array chips each of which emits light of a different color, and said at least three LED array chips are arranged to separately face said at least three band regions of the photosensitive surface, respectively.

According to a third aspect of the present invention, there is provided an exposure device comprising at lease three LED array chips each of which includes an array of LEDs, said each LED array chip emitting light of a different color, said array of LEDs of said each LED array chip including a first end LED closest to one end of the array and a second end LED closest to the other end of the array, wherein said at least three LED array chips are arranged in a row so that all LEDs of said at least three LED array chips are disposed on a straight line, an interval between the first end LEDs of two adjacent LED array chips being equal to an integer multiple of a pitch between two adjacent LEDs in said each LED array chip.

In a preferred embodiment, an interval between the second end LED of said each LED array chip and the first end LED of an adjacent LED array chip is equal to a half of an interval between the first and second LEDs in said each LED chip.

Other objects, features and advantages of the present invention will become apparent from the following description of the preferred embodiment given with reference to the accompanying drawings.

DETAILED DESCRIPTION OF THE PREFERRED EMBODIMENTS

Figure 1:
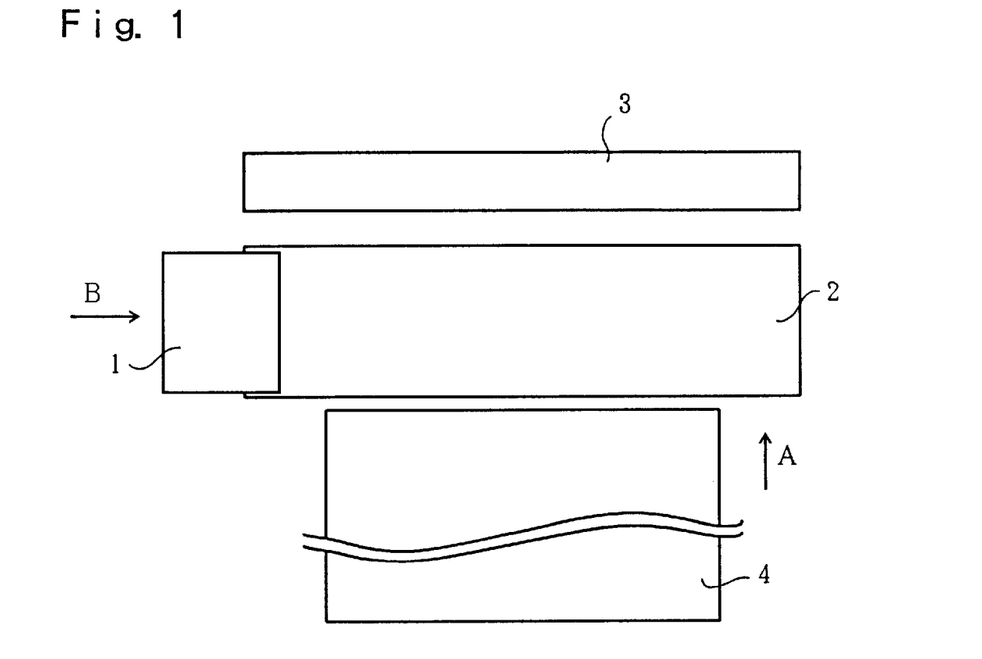
FIG. 1 is a schematic plan view showing a color printer embodying the present invention.

Referring first to FIG. 1 of the accompanying drawings, there is illustrated an embodiment of color printer according to the present invention. The illustrated printer mainly comprises a printing unit 1, a transcription unit 2 and a fixing unit 3.

The printing unit 1 is reciprocatively movable in the direction of arrow B and in the opposite direction for forming color images on a recording paper sheet 4 which is fed in the direction of arrow A. Further, the printing unit 1 is also reciprocatively movable within a small range perpendicularly to the plane of the sheet 4.

The transcription unit 2 is a station where patterned toner deposits of different colors formed at the printing unit 1 are electrostatically transcribed onto the paper sheet 4.

The fixing unit 3 heats the transcribed toner deposits (image) on the paper sheet 4 for fixing thereon. In place of the paper sheet 4, use may be made of a sheet-like or strip-like resin plate. Further, use may be also made of an intermediate transcription medium (intermediate recording medium) such as a transcription drum or belt from which the final image is further transcribed onto a target recording medium such as a paper sheet.

Though not illustrated, the printer further includes a drive unit for the printing unit 1, a feed unit for the paper sheet 4, a control unit for these units, and many other components. However, these components are not essential for the present invention and therefore are not described herein.

Figure 2:
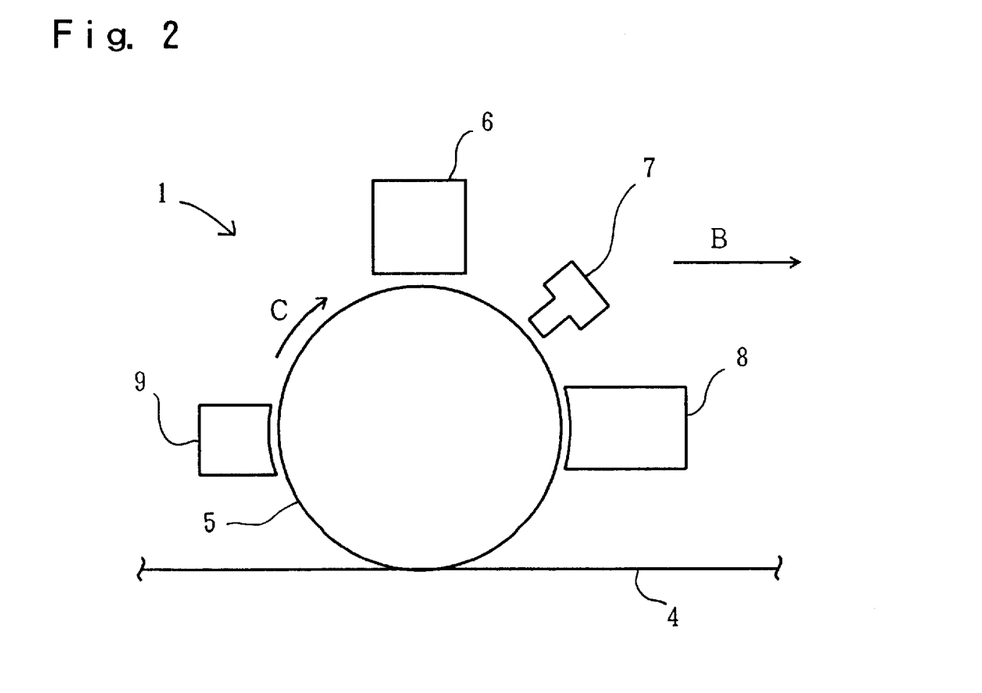
FIG. 2 is a schematic side view showing a printing unit of the same printer.

FIG. 2 schematically illustrates the arrangement of the printing unit 1. Specifically, the printing unit 1 includes a photosensitive drum 5, a electrostatic charging device 6, a printhead 7 as an exposure device, a developing device 8, and a charge-removing/cleaning device 9.

The photosensitive drum 5 has a diameter of e.g. 16 mm and is rotatable in the direction of arrow C while moving in the arrow B direction. The paper sheet is sandwiched between the transcription unit 2 and the drum. Thus, the patterned toner deposit on the rotating drum 5 is transcribed onto the paper sheet 4 in the course of its movement in the arrow B direction. It should be appreciated here that the photosensitive drum 5 may be replaced with an endless photosensitive belt which is rotatably supported by a plurality of rollers.

The electrostatic charging device 6, the printhead 7, the developing device 8 and the charge-removing/cleaning device 9 are arranged around the drum 5 in the mentioned order in the rotational direction of the drum (i.e. in the arrow C direction). The paper sheet 4 is held in contact with the circumferential surface of the drum 5 at a position between the developing device 8 and the charge-removing/cleaning device 9.

The electrostatic charging device 6 functions to electrostatically charge the circumferential surface of the photosensitive drum 5.

The printhead 7 projects dot beams onto the electrostatically charged surface of the drum 5 according to a set of image data for each different color for form an electrostatic latent image for that color.

The developing device 8 serves to supply a toner of each different color to the drum 5 for selective deposition at the corresponding latent image.

The charge-removing/cleaning device 9 removes the charge remaining on the drum 5 after transcription of the patterned toner deposit onto the recording sheet 4 while also removing the redundant toner.

Figure 3:
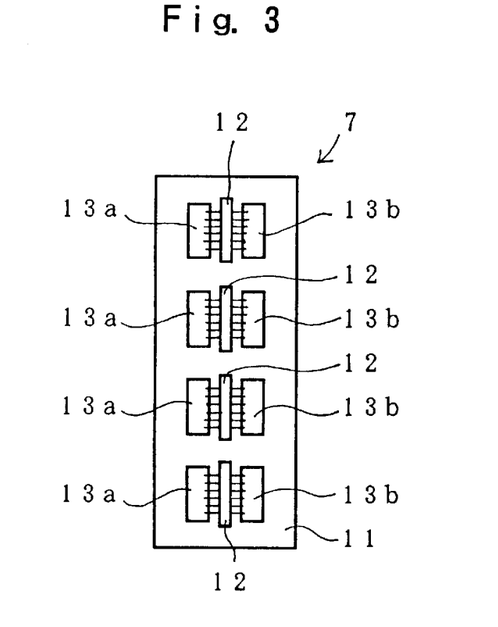
FIG. 3 is a plan view showing a printhead of the printing unit with a cover removed.
Figure 4:
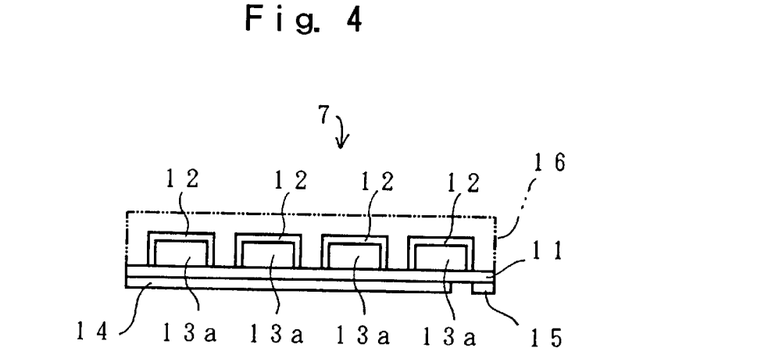
FIG. 4 is a side view of the printhead with the cover indicated in phantom lines.

FIG. 3 represents the printhead 7 in plan view with its cover removed, whereas FIG. 4 shows the same in side view. As shown, the printhead 7 includes a printed circuit board 11, four LED array chips 12, four pairs of drive ICs 13a, 13b, a heat sink plate 14, a connector 15, and a cover 16. The LED array chips 12 are arranged in a straight row on an obverse surface of the circuit board 11, and each of LED array chips 12 is electrically connected to a flanking pair of drive ICs 13a, 13b by wire-bonding. The heat sink plate 14 and the connector 15 are mounted on a reverse surface of the circuit board 11. As indicated by chain lines in FIG. 4, the cover 16 is mounted on the obverse surface of the circuit board 11 to enclose the LED array chips 12 together with the drive ICs 13a, 13b. Though not shown, the cover 16 carries a lens system (not shown) for focusing the light from the LED array chips 12 on the photosensitive drum 5 in a well known manner.

Each of the LED array chips 12 emits multiple light beams of a respective color in accordance with a respective set of image data for forming a corresponding electrostatic latent image on the circumferential surface of the photosensitive drum 5. Specifically, the four LED array chips 12 illustrated in FIG. 3 correspond to yellow (hereafter abbreviated as "Y"), magenta (hereafter abbreviated as "M"), cyan (hereafter abbreviated as "C") and black (hereafter abbreviated as "BK"), respectively. Each of the LED array chips 12 includes a multiplicity of light emitting diodes (e.g. sixty-four LEDs) arranged in a straight array extending along the rotational axis of the drum 5. The printhead 7 is arranged in a manner such that the array of LEDs faces the circumferential surface of the drum 5 with a predetermined spacing therefrom. In printing, selected LEDs (bits) of each chip 12 are actuated according to the corresponding set of image data for light emission onto the drum 5 to selectively eliminate the electrostatic charge, thereby forming an electrostatic latent image on the circumferential surface of the drum 5.

Each pair of drive ICs 13a, 13b drive a corresponding one of the LED array chips 12. The heat sink plate 14 serves to dissipate the heat generated by the LED array chips 12 and the drive ICs 13a, 13b. The connector 15 is connected to a flexible cord which supplies image data from outside. The cover 16 protects the LED array chips 12 together with the drive ICs 13a, 13b while holding the lens system for focusing the light from the LEDs of the respective chips 12 on the circumferential surface of the drum 5.

Figure 5:
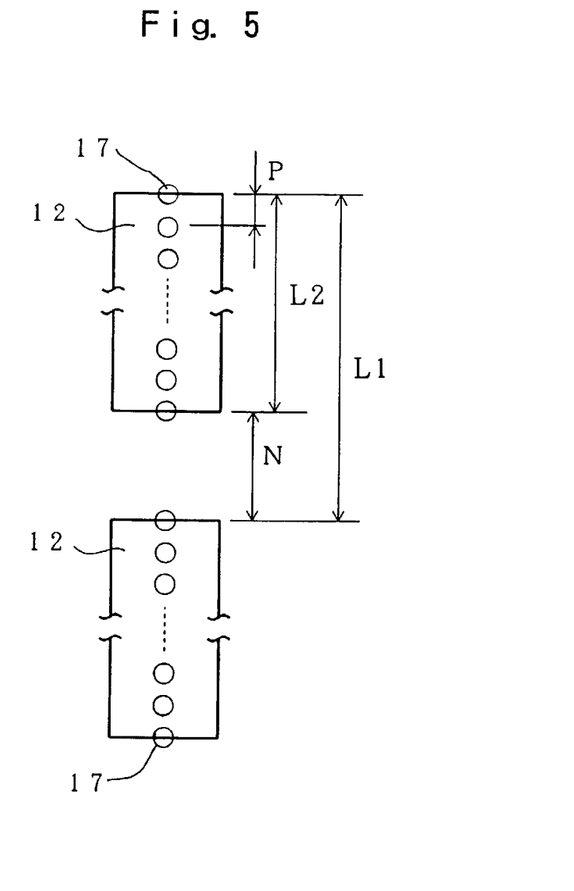
FIG. 5 is an enlarged plan view showing the arrangement of LED array chips in the printhead.

FIG. 5 shows the arrangement of the LEDs in the respective LED array chips 12. In this figure, the respective LEDs are denoted by reference numeral 17. For the convenience of the following description, the LED located closest to one shorter edge (uppermost edge in FIG. 5) of each chip 12 is referred to as "first end LED", whereas the LED located closest to the other shorter edge (lowermost edge in FIG. 5) of the chip is referred to as "second end LED". Further, while the respective shorter edges of the chip are shown to coincide with the respective centers of the first and second end LEDs, it should be understood that the actual length of the chip is longer than the array length of the LEDs 17 in the same chip.

According to the illustrated embodiment, the interval L1 between the respective first end LEDs 17 of each two adjacent chips 12 is an integer multiple of the pitch P between each two adjacent LEDs in each chip. Further, since the interval L2 between the first and second end LEDs of the same chip is naturally an integer multiple of the pitch P, the interval N between the second end LED of one chip and the first end LED of an adjacent chip is also an integer multiple of the pitch P. Moreover, according to the illustrated embodiment, the interval L2 is set to be two times as great as the interval N.

In the illustrated embodiment, use is made of plural LED array chips for emitting light of different colors because LEDs contribute to a reduction of cost, size and weight of the printer while enabling a high-density arrangement of dots. However, a plurality of laser devices may be provided as sources for generating light of different colors.

In operation, when the paper sheet 4 fed in the arrow A direction (FIG. 1) advances to a predetermined printing position, the printing unit 1 starts moving in the arrow B direction. At this time, the photosensitive drum 5 rotating in the arrow C direction (FIG. 2) pulls in the sheet 4 between the drum 5 and the transcription unit 2. The rotation of the drum 5 and the lateral movement of the printing unit 1 are performed by a common drive source to occur synchronously, so that no slip takes place between the drum 5 and the paper sheet 4.

The circumferential surface of the drum 5 is electrostatically charged by the charging unit 6. Further, the printhead 7 emits light beams of different colors toward the drum 5 to form an electrostatic latent image for each color. More specifically, the circumferential surface of the drum 5 is axially divided into four different regions for the respective colors Y, M, C, BK, and the respective LED array chips 12 of the printhead 7 corresponding to these colors emit light beams onto the respective divided regions of the drum according to the respective sets of image data, thereby selectively eliminating the charge in each region to form an electrostatic latent image.

The developing device 8 supplies toners of the respective colors to the corresponding regions of the drum 5 for electrostatic deposition. The developing device 8 separately stores toners of different colors Y, M, C, BK and has toner outlets (not shown) in corresponding relation to the respective color regions of the drum 5. The toners are electrostatically attracted by the transcription unit 2 for transcription onto the paper sheet 4. Such an image transcribing step is performed while the drum 5 rotates, so that the image for each color is continuously formed widthwise of the sheet 4.

When the printing unit 1 moves in the arrow B direction from the left limit position to the right limit position, it ascends slightly and moves reversely to return to its initial lateral position. Then, the printing unit 1 descends slightly to the initial level. In the meantime, the paper sheet 4 is fed in the arrow A direction by a predetermined amount which is an integer multiple of the pitch P due to the above-described arrangement of the LED array chips 12.

The complete color printing operation is performed by repeating the above-described steps. As a result, the different color images overlap each other to provide a combined full-color image which is successively fixed on the paper sheet 4 by the fixing unit 3 as the sheet advances.

The operation of overlapping the different color images is now described in more detail with reference to FIGS. 6 through 12.

Figure 6:
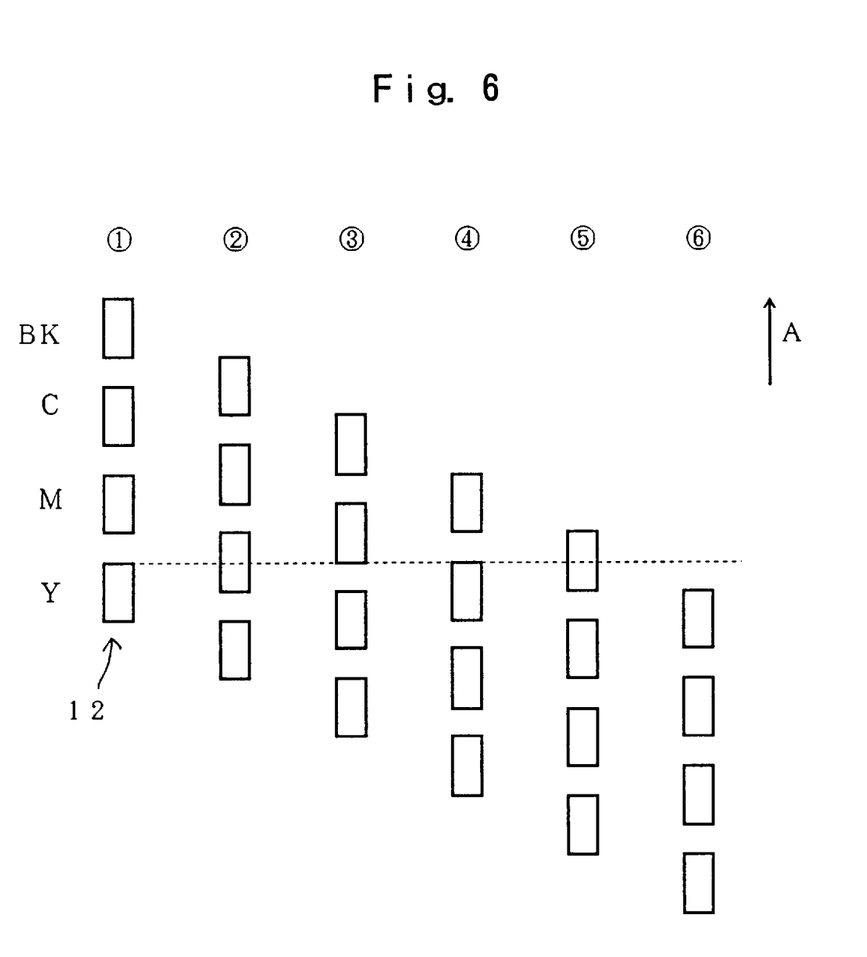
FIG. 6 is a view showing the positional shift of the printhead relative to a paper sheet.

FIG. 6 shows changes of the relative positional relation between the respective LED chips 12 (corresponding to the colors Y, M, C, BK) of the printhead 7 and the paper sheet 4 as the printing operation proceeds. Specifically, every time the printhead 1 moves in the arrow B direction (hereafter referred to as "primary scanning direction"), the paper sheet 4 advances by an amount L2 in the arrow A direction (hereafter referred to as "secondary scanning direction"). Thus, the relative positional relation between the printhead 7 and the sheet 4 changes by the amount L2 in the secondary scanning direction upon every movement of the printhead 7 in the primary scanning direction. It should be understood here that, in FIG. 6, though the printhead 7 (LED array chips 12) is shown to move relative to the sheet 4 in the direction opposite to the secondary scanning direction, the sheet 4 actually moves relative to the printhead 7 in the secondary scanning direction.

Figure 7:
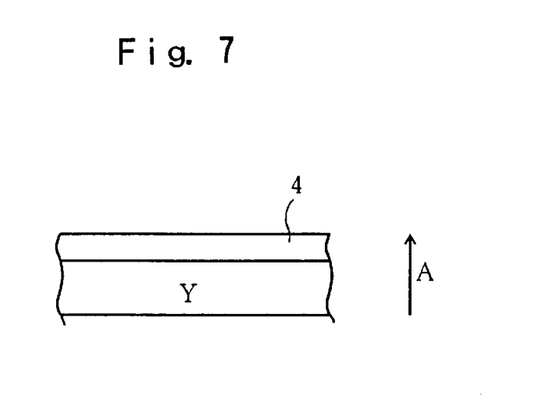
FIGS. 7 through 12 are plan views showing the successive steps of the color printing operation.

In the first primary scanning step, the paper sheet 4 has advanced to a first scanning position where the printing zone of the sheet fully overlaps the color-Y LED array chip 12 alone, as shown in FIG. 6-1. In this condition, the color-Y LED array chip forms a first color-Y image on the sheet 4 by moving in the primary scanning direction, as shown in FIG. 7. The width of the first color-Y image (i.e., the dimension of the color-Y image in the secondary scanning direction) corresponds substantially to each advancing stroke L2 of the sheet 4 which in turn corresponds to the number of the dots of each LED array chip.

Figure 8:
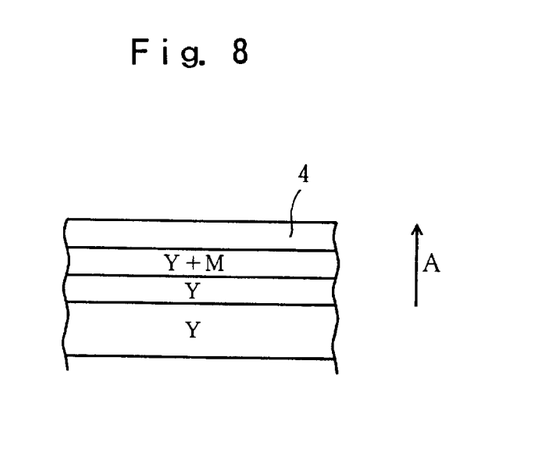

In the second primary scanning step, the paper sheet 4 has advanced to a second scanning position where the printing zone of the sheet overlaps the entirety of the color-Y LED array chip and a half of the color-M LED array chip, as shown in FIG. 6-2. In this condition, the color-Y LED array chip forms a second color-Y image on the sheet 4, whereas the color-M LED array chip forms a first color-M image which overlaps a half of the first color-Y image, as shown in FIG. 8. The width of the second color-Y image is L2, whereas the width of the first color-M image is half L2.

Figure 9:
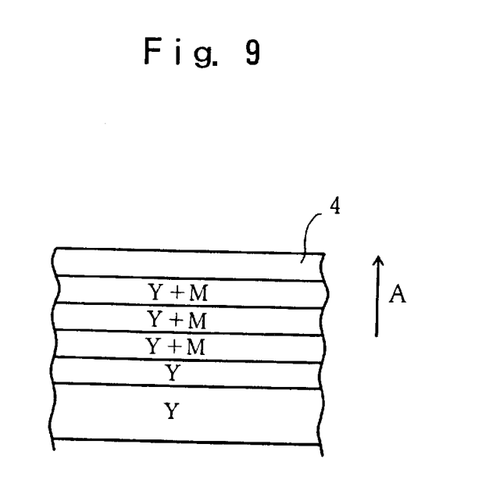

In the third primary scanning step, the paper sheet 4 has advanced to a third scanning position where the printing zone of the sheet fully overlaps the color-Y LED array chip and the color-M LED array chip, as shown in FIG. 6-3. In this condition, the color-Y LED array chip forms a third color-Y image on the sheet 4, whereas the color-M LED array chip forms a second color-M image which overlaps the remaining half of the first color-Y image and a half of the second color-Y image, as shown in FIG. 9. The width of the third color-Y image is L2, and the width of the second color-M image is also L2.

Figure 10:
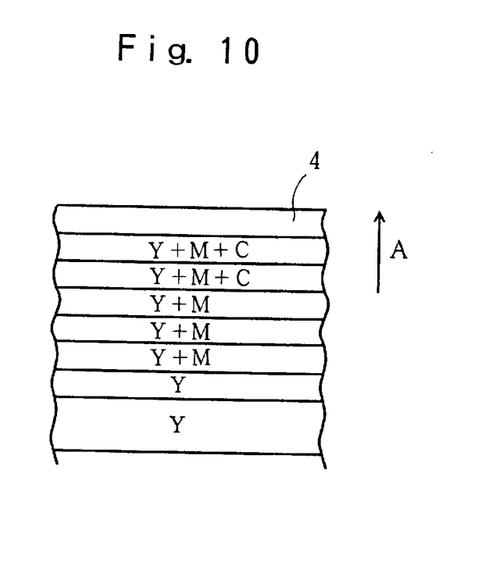

In the fourth primary scanning step, the paper sheet 4 has advanced to a fourth scanning position where the printing zone of the sheet fully overlaps the color-Y LED array chip, the color-M LED array chip and the color-C array chip, as shown in FIG. 6-4. In this condition, the color-Y LED array chip forms a fourth color-Y image on the sheet 4, as shown in FIG. 10. Further, the color-M LED array chip forms a third color-M image which overlaps the remaining half of the second color-Y image and a half of the third color-Y image, whereas the color-C LED array chip forms a first color-C image which fully overlaps the first color-Y image and the first color-M image while further overlapping a half of the second color-M image, as also shown in FIG. 10. The respective widths of the fourth color-Y image, the third color-M image and the first color-C are equally L2.

Figure 11:
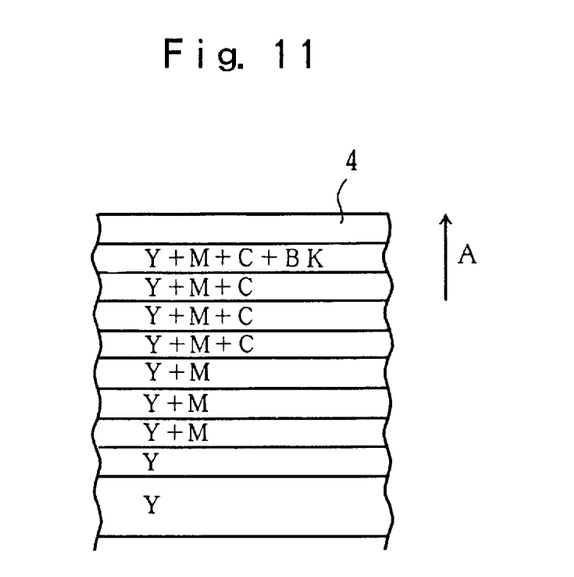

In the fifth primary scanning step, the paper sheet 4 has advanced to a fifth scanning position where the printing zone of the sheet fully overlaps the color-Y LED array chip, the color-M LED array chip and the color-C LED array chip while also overlapping a half of the color-BK LED array chip, as shown in FIG. 6-5. In this condition, the color-Y LED array chip forms a fifth color-Y image on the sheet 4, whereas the color-M LED array chip forms a fourth color-M image which overlaps the remaining half of the third color-Y image and a half of the fourth color-Y image, as shown in FIG. 11. Further, the color-C LED array chip forms a second color-C image which overlaps the second color-Y image while overlapping the remaining half of the second color-M image and a half of the third color-M image, whereas the color-BK LED array chip forms a first color-BK image which overlaps a half of the first color-C image, as also shown in FIG. 11. The width of the first color-BK image is half L2.

Figure 12:
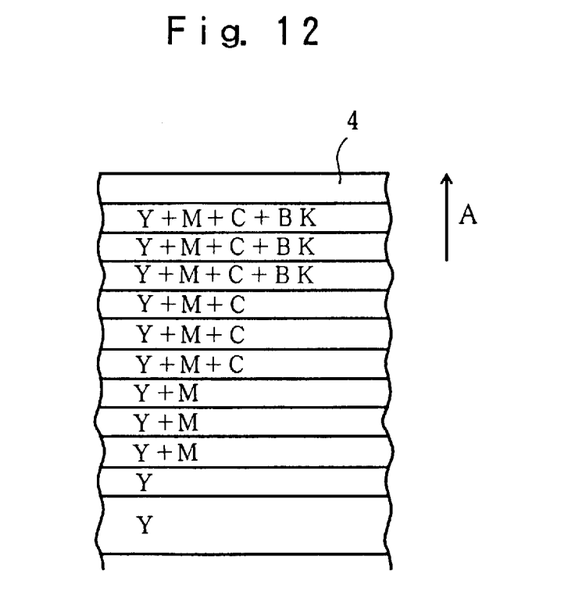

In the sixth primary scanning step, the paper sheet 4 has advanced to a sixth scanning position where the printing zone of the sheet fully overlaps all of the LED array chips 12, as shown in FIG. 6-6. In this condition, the color-Y LED array chip forms a sixth color-Y image on the sheet 4, whereas the color-M LED array chip forms a fifth color-M image which overlaps the remaining half of the fourth color-Y image and a half of the fifth color-Y image, as shown in FIG. 12. Further, the color-C LED array chip forms a third color-C image which overlaps the third color-Y image while overlapping the remaining half of the third color-M image and a half of the fourth color-M image, whereas the color-BK LED array chip forms a second color-BK image which overlaps the remaining half of the first color-C image and a half of the second color-C image, as also shown in FIG. 12. The width of the second color-BK image is L2.

In the following steps, a further overlapping image of Y+M+C+BK is successively added to provide a full color print every time the printhead 7 makes a movement in the primary scanning direction. At the final stage of the printing operation, the color-Y LED array chip first comes out of the overlapping relation relative to the printing zone of the paper sheet 4, which is followed successively by the color-M LED array chip, the color-C LED array chip and the color-BK LED array chip.

In this way, a full color image is formed on the paper sheet 4 by overlapping the images of the four different colors Y, M, C, BK. During such a printing operation, an unillustrated data processing unit supplies renewed sets of image data to the respective LED array chips 12 upon every movement of the printhead 7 in the primary scanning direction.

The present invention being thus described, it is obvious that the same may be varied in many other ways. For instance, the black color BK may be omitted because this color can be alternatively provided by the combination of the remaining colors Y, M, C although the use of the black color BK is advantageous for improving the printing quality while increasing the speed of making only a monochrome print. Further, additional colors (toners) may also be used to additionally enhance the color print quality. Such variations are not to be regarded as a departure from the spirit and scope of the invention, and all such variations as would be obvious to those skilled in the art are intended to be included within the scope of the following claims.

I claim:

1. A method for making color images by electrophotography comprising the steps of:

rotating a rotary member having an endless photosensitive surface which has at least three different band regions divided in a direction perpendicular to a rotational direction of the rotary member;

electrostatically charging the photosensitive surface of the rotary member;

simultaneously irradiating said at least three different band regions each with light of a different color to electrostatically form a different latent image in each of said least three different band regions;

simultaneously developing the latent images of said at least three different band regions to provide a set of differently colored images; and transcribing the set of differently colored images onto a recording medium;

wherein the recording medium is indexed in a direction perpendicular to the rotational direction of the rotary member after the set of differently colored images is transcribed onto the recording medium; and wherein the above steps are repeated in a manner such that a subsequently transcribed set of differently colored images overlaps a previously transcribed set of differently colored images to form combined color images on the recording medium.

2. The method according to claim 1, wherein the recording medium is a paper sheet, the rotary member being a photosensitive drum which rotates in contact with the recording medium, the photosensitive drum being moved in a direction perpendicular to a rotational axis of the drum for transcribing the set of differently colored images onto the paper sheet in band form.

3. The method according to claim 1, wherein the set of differently colored images includes a yellow image, a magenta image, a cyan image and a black image.

4. An apparatus for making color images by electrophotography comprising:

a rotary member having an endless photosensitive surface which has at least three different band regions divided in a direction perpendicular to a rotational direction of the rotary member;

a charging device for electrostatically charging the photosensitive surface of the rotary member;

an exposure device for simultaneously irradiating said at least three different band regions each with light of a different color to electrostatically form a different latent image in each of said least three different band regions;

a developing device for simultaneously developing the latent images of said at least three different band regions to provide a set of differently colored images;

a transcription unit for transcribing the set of differently colored images onto a recording medium; and means for repetitively indexing by a predetermined amount in a direction perpendicular to the rotational direction of the rotary member every time a set of differently colored images is transcribed onto the recording medium, so that a subsequently transcribed set of differently colored images overlaps a previously transcribed set of differently colored images to form combined color images on the recording medium.

5. The apparatus according to claim 4, wherein the exposure device comprises at least three LED array chips each of which emits light of a different color, said at least three LED array chips being arranged to separately face said at least three different band regions of the photosensitive surface, respectively.

6. An exposure device comprising at least three LED array chips each of which includes an array of LEDs, said each LED array chip emitting light of a different color, said array of LEDs of said each LED array chip including a first end LED closest to one end of the array and a second end LED closest to the other end of the array, wherein said at least three LED array chips are arranged in a row so that all LEDs of said at least three LED array chips are disposed on a straight line, an interval between the first end LEDs of two adjacent LED array chips being equal to an integer multiple of a pitch between two adjacent LEDs in said each LED array chip.

7. The exposure device according to claim 6, wherein an interval between the second end LED of said each LED array chip and the first end LED of an adjacent LED array chip is equal to a half of an interval between the first and second LEDs in said each LED chip.

* * * * *